(12) United States Patent
Weiss

(10) Patent No.: US 6,585,504 B2
(45) Date of Patent: Jul. 1, 2003

(54) COTTON CANDY APPARATUS UTILIZING SPINNER HEAD WITH FILM HEATER

(75) Inventor: Ronald R. Weiss, Okeana, OH (US)

(73) Assignee: Gold Medal Products Company, Inc., Cincinnati, OH (US)

(*) Notice: Subject to any disclaimer, the term of this patent is extended or adjusted under 35 U.S.C. 154(b) by 51 days.

(21) Appl. No.: 09/728,134

(22) Filed: Nov. 30, 2000

(65) Prior Publication Data
US 2002/0062743 A1 May 30, 2002

(51) Int. Cl.⁷ ................................................. A23G 3/02
(52) U.S. Cl. ..................................... 425/9; 425/8; 264/8
(58) Field of Search ........................... 425/8, 9; 264/8; 99/348

(56) References Cited

U.S. PATENT DOCUMENTS

| | | | |
|---|---|---|---|
| 1,489,342 A | 4/1924 | Brent | 425/9 |
| 3,036,532 A | 5/1962 | Bowe | 425/9 |
| 3,070,045 A | 12/1962 | Bowe | 425/9 |
| 3,073,262 A | 1/1963 | Bowe | 425/9 |
| 3,483,281 A | 12/1969 | Chisholm | 264/8 |
| 4,526,525 A | 7/1985 | Oiso et al. | 425/9 |
| 4,793,782 A | 12/1988 | Sullivan | 425/7 |
| 4,872,821 A | 10/1989 | Weiss | 425/9 |
| 5,066,430 A | 11/1991 | Matthews | 264/8 |
| 5,145,687 A | 9/1992 | Parker | 425/9 |
| 5,177,341 A | 1/1993 | Balderson | 219/543 |
| 5,441,754 A | 8/1995 | Evans, Sr. | 426/483 |
| 5,445,769 A | 8/1995 | Rutkowski et al. | 264/8 |
| 5,460,498 A | 10/1995 | Steel et al. | 425/8 |
| D365,981 S | 1/1996 | Sullivan | D9/337 |
| 5,498,144 A | 3/1996 | Francis et al. | 425/9 |
| 5,766,643 A | 6/1998 | Hammon | 425/9 |

OTHER PUBLICATIONS

Watlow Industries, *Thick Film Heaters on Stainless Steel Offer Low Profile and High Performance*, Brochure (1 page), No date.

Primary Examiner—Robert Davis
Assistant Examiner—Thu Khanh T. Nguyen
(74) Attorney, Agent, or Firm—Wood, Herron & Evans, LLP

(57) ABSTRACT

An apparatus for making cotton candy comprises a bowl and a motor with a spinner head mounted in the bowl and coupled to the motor for rotation about an axis. The spinner head comprises a perforated band which extends generally circumferentially around the spinner head to rotate with the spinner head for delivering molten sugar from the spinner head and into the bowl to make cotton candy. A film heater includes a film which is operable for generating heat when an electrical current is delivered thereto. The film heater is applied against a surface of the perforated band for heating the band and melting sugar proximate the perforated band to make cotton candy.

28 Claims, 3 Drawing Sheets

COTTON CANDY APPARATUS UTILIZING SPINNER HEAD WITH FILM HEATER

FIELD OF THE INVENTION

The present invention relates generally to cotton candy machines and methods of making cotton candy, and more particularly, to an improvement in cotton candy spinner heads.

BACKGROUND OF THE INVENTION

Machines for spinning granular sugar into sugar filaments or "cotton candy" are generally known and have been employed for some time at events such as carnivals, fairs and circuses. A typical cotton candy machine is operable to heat sugar granules into molten sugar and to then cast or spin the molten sugar into a fiber or strand form using centrifugal force. The candy fibers or strands cool or congeal and are then directed into a bowl or tub where they are usually gathered on a stick or rolled paper tube for service and consumption. The sugar is usually colored to impart a color to the finished candy.

In order to carry out the heating and spinning function, a typical cotton candy machine includes a base which houses a motor for driving a rotatable shaft. A spinner head is mounted to the shaft to be rotated and defines a chamber for receiving raw granular sugar. The spinner head includes one or more heating elements positioned therearound, which melt the raw sugar granules into a molten form. The rotation of the spinner head actually causes the sugar to contact the heating elements for melting. Annular slots or perforations are also formed in the spinner head and surround the chamber and the heating elements. The rotation of the spinner head further imparts a centrifugal force on the molten raw sugar so that it is spun or slung out of the slots in the spinner head after it is melted and passes by or through the heating elements, forming sugar filaments. The molten sugar filaments cool or congeal as they are slung out of the spinner head and collect on the inner surface of a bowl or basket mounted on the base to surround the spinner head. The congealed sugar filaments in the basket are then transferred to a paper tube or the like by rolling an end of the tube about the circumference of the basket to collect the cotton candy on the tube end. Examples of cotton candy machines are described in more detail in U.S. Pat. Nos. 1,489,342; 3,036,532; 4,145,687; 4,872,821; 5,145,687; 5,441,754; 5,498,144; 5,766,643 and 4,872,821, which are all expressly incorporated herein by reference in their entirities for further detail of possible embodiments incorporating the aspects of the invention and for background detail.

Existing cotton candy machines use a variety of different heating elements. In some machines, the heating element is in the form of a flattened coil with vertically oriented coil turns formed of nickel nikrome. The coils are spaced closely together. The flattened coil is formed into the shape of a circular band and is held in a perforated heater holder. The heater holder is coated with aluminum oxide for electrically insulating the heater holder from the heating element. The sugar melts due to the heat of the heating element, and passes through the closely spaced vertical coils of the heating element and out of the perforations of the heater holder. Such a design provides uniform heat over a significant portion of the heater holder.

In other machines, the heating element is also a coil, except with only three or four horizontally oriented turns having large spaces therebetween. A mesh screen is used in conjunction with such a coil to keep the granular sugar from passing through the coil so that it can be melted. The heating element and screen are then placed inside a perforated ring. Such a heating element tends to only provide heat right at the three or four turns and thus does not uniformly melt the sugar. As a result, the cotton candy is sporadically formed from the spinner head. While such cotton candy machines have been utilized successfully in the past, they have still several drawbacks, in addition to those previously mentioned.

In particular, the heating elements of various of the cotton candy machines referenced above have certain drawbacks. Many such heating elements require various parts which must be properly formed and fabricated to operate within the particular design of the spinner head. For example, the heating elements must be specifically formed and configured to efficiently melt the sugar within the spinner head but to also allow the molten sugar to pass through and out the spinner head. The heating elements also must be mounted and seated properly in the heater holder of the spinner head.

Furthermore, the coil of the heating element of some designs is uninsulated, thereby requiring a sophisticated, space-age and expensive dielectric coating to be formed on the heater holder. In addition to the expense, such coatings may chip, which makes the heating element prone to failure if it shorts to ground through the heater holder. Such fabrication complexities increase the cost of the machine and its manufacture and also make it more prone to malfunction.

In addition, the prior art heating elements create a ballast in the outside circumference of the spinning head. The centrifugal force on such a ballast causes undesired wear on the motor and bearings which turn the spinner head. Accordingly, it would be desirable to eliminate the ballast effect created by existing heating elements.

Still further, if tubular heating elements are used, they do not always uniformly and thoroughly provide heat over the surface of the spinner head which incorporates the perforations or slots through which the molten sugar passes. Accordingly, the heat applied to the molten sugar in the spinner head may be uneven and sporadic in certain areas of the spinner head. As such, it is desirable to provide more uniform heat throughout the spinner head so that sugar in the head is melted efficiently and uniformly around the spinner head.

In addition, other portions of the machine must be specifically fabricated to interface with existing heating element designs. For example, several of the cotton candy machines disclosed in the U.S. patents listed above, notably U.S. Pat. Nos. 4,872,821; 5,441,754; and 5,766,643, utilize a special spinner head ring or band with slots therein for slinging the molten sugar under centrifugal force. The band must also, however, act as a support or heater holder for the heating elements. As such, the band has to be specifically fabricated and formed to engage and partially encase the heating elements. As will be readily appreciated, machining the specialized parts further increases the overall cost of fabricating the cotton candy machine.

An additional drawback is created by the operation of existing heating elements. Such heating elements have been known to malfunction due to failure of the dielectric which they contact.

In view of the above disadvantages of prior art cotton candy machines, it is desirable to improve cotton candy machines and methods of manufacturing cotton candy and to reduce the complexity of the machine and process and thereby reduce its cost. Moreover, it is desirable to provide a cotton candy machine with fewer and simpler parts to further reduce costs and improve the operation, reliability, and heat characteristics of the machine.

SUMMARY OF THE INVENTION

To these ends, one embodiment of the invention provides an apparatus for making cotton candy which comprises a bowl and a spinner head mounted in the bowl and coupled to a motor for rotation of the spinner head about an axis. The spinner head comprises a perforated band which extends generally circumferentially around the spinner head to rotate with the spinner head. The perforated band includes a plurality of perforations, such as slots, which are formed therein for delivering molten sugar from the spinner head and into the bowl. In that way, cotton candy is made.

In accordance with one aspect of the present invention, a film heater, which includes a film operable for generating heat when electrical current is delivered thereto, is applied or thermally coupled against a surface of the perforated band. The film heater applied against the band surface is operable for supplying heat to the system and melting sugar proximate the perforated band to make cotton candy. The film of the film heater is relatively thin and eliminates the bulk and ballast associated with prior art heating elements.

In one embodiment of the invention, the film heater may comprise a resistive film which is applied directly onto a surface in a desired manner and pattern for forming the film heater. The resistive film might be applied directly to a surface of the band, such as by being deposited, plated, or printed onto the band surface. Generally, when the film is applied directly to the surface, an electrically insulative layer of material separates the film and the band for electrical isolation of those elements.

Alternatively, the film may be applied to a separate substrate to form the film heater which intermediate substrate is then positioned or applied against the surface of the perforated band. The film might also be incorporated into or onto a flexible substrate to form the film heater, which flexible substrate is then coupled or otherwise applied to the band surface. Various appropriate film materials may be utilized to form the film heater. In one aspect of the invention, a resistive film (e.g. resistive ink) may be used.

In accordance with another aspect of the present invention, as noted above, electrically insulative materials might be utilized around the film, such as between the film and the band surface, or on an outside surface of the film. For example, various dielectric materials are suitable for such purposes. The dielectric materials prevent the film from shorting to the perforated band or to other conductive surfaces, and prevent shock hazards.

In accordance with another aspect of the present invention, the film of the film heater is generally coextensive with a significant portion of the band surface for uniformly and thoroughly heating the sugar which contacts the heater and band surface. To that end, the film might be formed somewhat coextensively with the band surface, leaving appropriate openings for the sugar to pass through. Alternatively, the film may be formed in a specific pattern which is contained within the boundaries of the band surface.

In accordance with another aspect of the present invention, the band has perforations or openings therein which are configured for preventing granular sugar from passing through the band unmelted, and for ensuring a fine, not coarse, cotton candy product. In an embodiment of the invention where the film is deposited directly on the band, the film, and the film heater formed thereby, have open areas which are generally coextensive with portions of the band apertures. As such, the invention eliminates various parts and structures from prior art machines which were configured to capture the granular sugar until it melted. In the present invention, the perforations of the band are configured to ensure melting of the granular sugar and to ensure that molten sugar is predominantly spun from the machine at the desired size for the strands.

One embodiment of the invention utilizes a spinner head having an upper head and a cap wherein the perforated band and film are positioned between the upper head and cap. The upper head and cap may be formed of a rigid material, such as a polymer, while the perforated band may be formed of a suitable material, such as stainless steel or aluminum.

The present invention provides significant advantages over the prior art by simplifying the design, and therefore, the fabrication of the cotton candy machine and thereby reducing its cost and increasing its reliability. Furthermore, the present invention provides a uniform application of heat over the surface of the perforated band which is contacted by the sugar to efficiently melt the sugar. Furthermore, the design of the perforated band is simplified and the ballast of prior art heating elements is significantly reduced. Therefore, the reliability of the cotton candy machine is further enhanced. Still further, the operation of the film as a film heater within the cotton candy machine of the invention reduces the possibility of heater malfunction.

These advantages, and other advantages of the present invention are set forth in greater detail hereinbelow.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

DETAILED DESCRIPTION OF THE INVENTION

Figure 1:
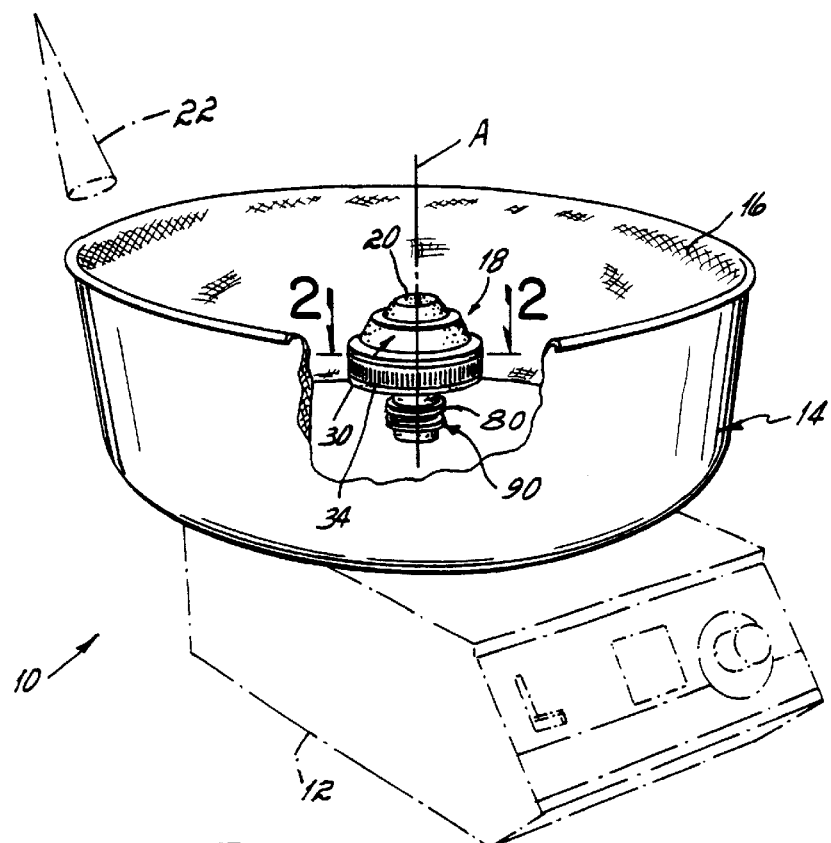
FIG. 1 is a perspective view of one embodiment of a cotton candy machine according to the invention.

Referring now to the drawings, FIG. 1 shows a cotton candy machine 10 of one type with which one embodiment of the invention may be used. The machine 10 includes a motor supporting base 12 and a collecting bowl or basket 14 mounted on the base 12. The bowl or basket 14 has a mesh candy collector or liner 16 therein, and a spinner head 18, according to the invention, is disposed on the center axis A of the bowl 14. The base 12 is provided with a series of controls and mounts a suitable motor therein (not shown) for rotating the spinner head 18 about the axis A. Slip rings 80, 90 are shown in FIG. 1 and provide electrical contacts for the film heater of the invention; however, such rings will normally be covered when the machine is in use.

In use, granular sugar is poured into an opening 20 in the spinner head 18. The spinner head 18 is rotated and simultaneously heated to melt the granular sugar and fling the molten sugar outwardly toward the mesh candy collector 16 using centrifugal force. The molten sugar congeals between the head 18 and liner 16. A paper cone 22 or the like can be inserted between liner 16 and the spinner head 18 for collecting the cotton candy thereon for consumption. The candy might also be collected in other ways as are conventional. The embodiment as specifically disclosed herein is only one type of machine for utilizing the present invention and is not limiting with respect to the invention.

Figure 2:
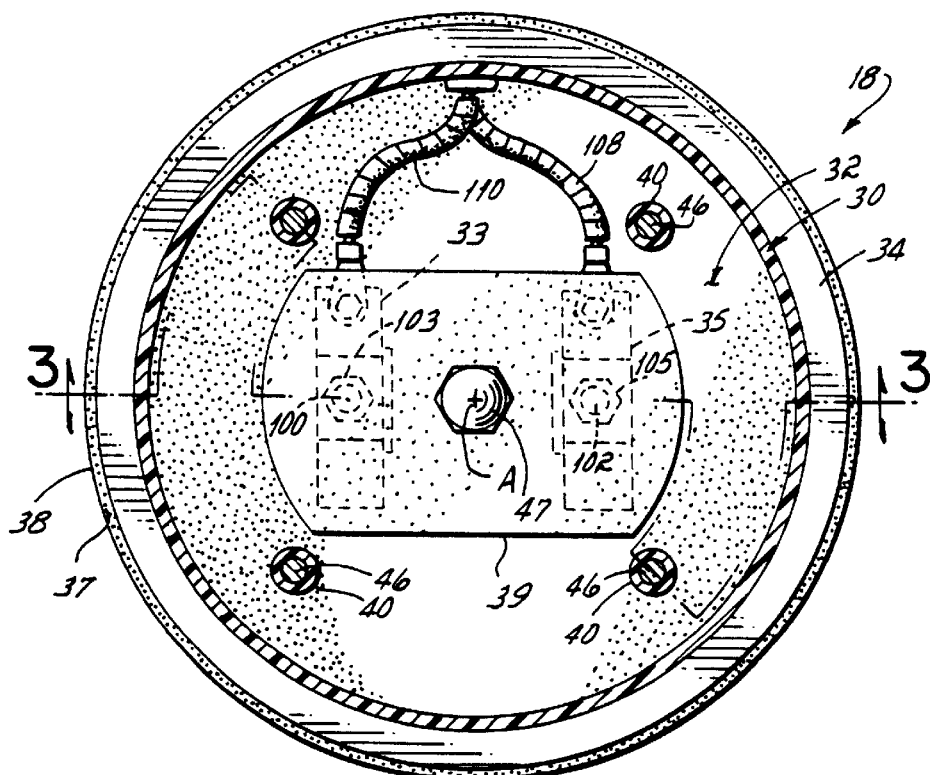
FIG. 2 is view taken along line 2—2 of FIG. 1.
Figure 3:
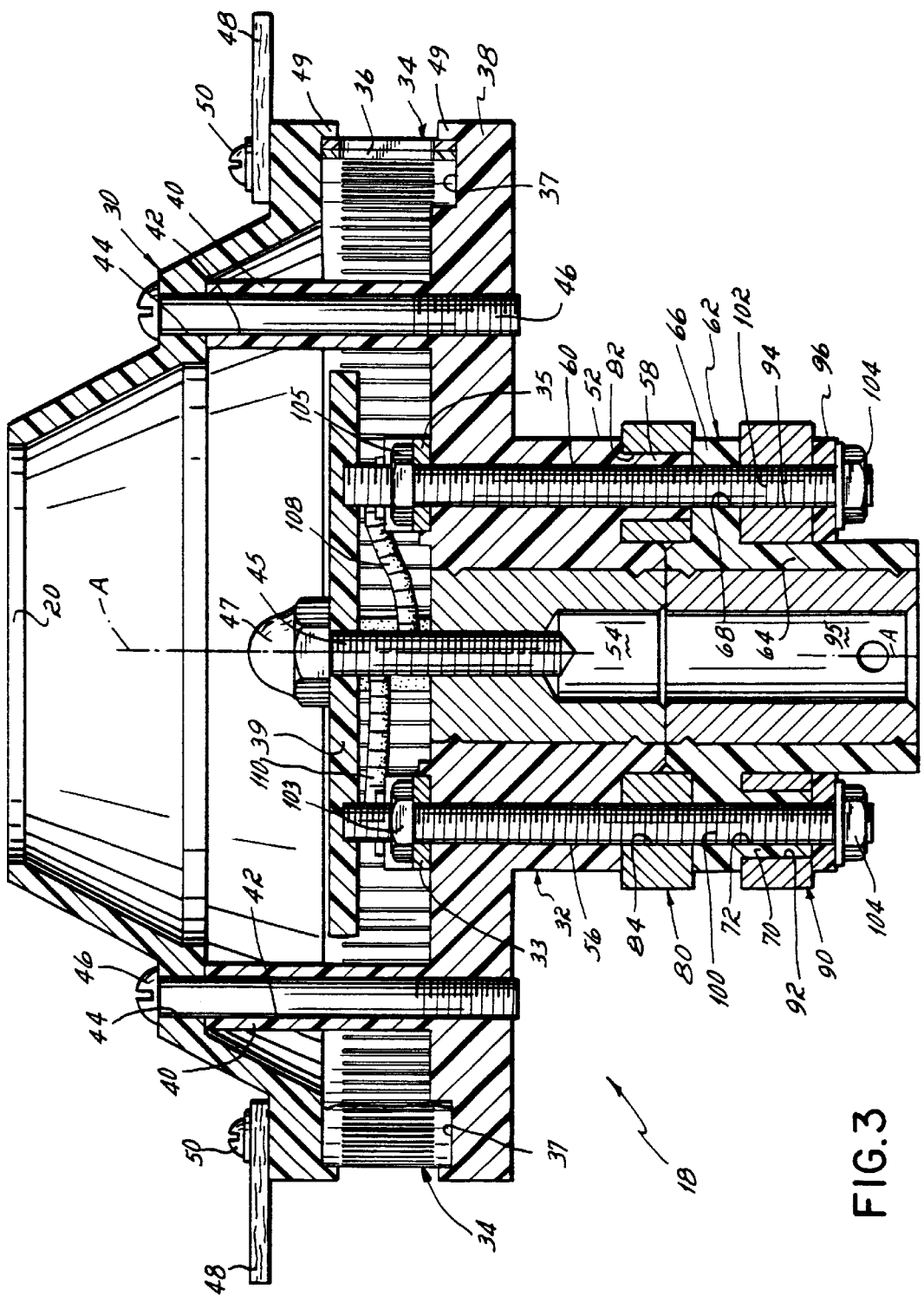
FIG. 3 is a view taken along line 3—3 of FIG. 2.

Turning now to FIGS. 2 and 3, the details of the spinner head 18, according to one embodiment of the present invention are illustrated therein. The spinner head 18 includes a spinner cap 30 and an upper head 32. Disposed between the cap 30 and the upper head 32 is a perforated band 34 and a film heater 36 having electrical connections 33 and 35. The upper head 32 has a recess 37 adapted to receive the perforated band 34 and film heater 36. The film heater incorporates a heated film as discussed in greater detail below.

It will be appreciated that the spinner head 18 of the present invention can utilize a variety of different perforated bands or perforated structures in combination with a film heater in accordance with the principles of the invention. Particularly, in an embodiment of the invention wherein the film of the film heater is applied directly onto the band, such as by printing, plating, or other various deposition techniques, the band may take various different forms. Generally, in accordance with the invention, the band should prevent granular sugar from escaping the spinner head before it is melted, since the film heater directly applied thereto will not provide a physical structure for doing so. It will also be appreciated that the spinner head 18 of the present invention can be utilized with a cotton candy machine having a single perforated band and film heater or multiple perforated bands and film heaters. Spinner head structures having multiple bands, for example, which would be suitable for use in the present invention, are disclosed in U.S. Pat. Nos. 5,441,754 and 5,498,144. Therefore, the present invention contemplates single band and multiple band embodiments.

In accordance with one aspect of the present invention, the perforated band 34 operates in conjunction with a film heater 36 for heating the molten sugar so it passes through the perforated band. The film heater 36 of the invention generally utilizes a film or film element which is operable for generating heat when an electrical current is delivered thereto. Generally, a resistive material forms the film and the film heats up when current is delivered thereto. The film heater and film are applied in an appropriate way against a surface of the perforated band 34 to provide heat to the system and to the band to melt the sugar. In the embodiment shown in the Figures, the film heater is applied against an inside surface of the band. Applied as such, the film heater 36 provides heat and heats band 34 for melting sugar proximate the inside surface of the perforated band. The molten sugar then passes through the band to form cotton candy.

The film heater 36 incorporating the heated film may be interfaced with the band 34 in various different ways. Therefore, the term "applied" as used herein to describe the film heater being applied against a surface of the band contemplates various forms of the film heater. For example, in one embodiment, the film of the film heater might be positioned directly on a surface of the band. That is, the film might be printed, deposited, plated or otherwise positioned onto the band surface. When deposited or applied directly onto the band surface, the film heater will generally comprise the film itself and any insulative materials as noted below. Alternatively, the film may be deposited onto an intermediate substrate wherein the substrate is then applied to the band surface to transfer heat to the band and overall system. In such an embodiment, the film heater comprises not only the film, but also the intermediate substrate and any insulative materials. Various isolating layers, such as electrically insulative layers may be incorporated into the film heater on one or both sides of the film, as noted. Usually, such insulative layers are necessary to isolate the film electrically from the conductive band or intermediate substrate which are usually formed of metal. Therefore, the term "applied" as used herein is not limited to direct contact between the film element of the heater and the band.

As referred to herein, the term "film" and "film heater" are directed to heating elements or resistive conductors which are relatively thin with respect to their possible length and width dimensions. Such films may be printed, plated or otherwise deposited on the surface to be heated. Therefore, such heated films are generally considered to be two-dimensional heaters, although they do have a certain finite thickness, as will be understood by a person skilled in the art. Film heaters suitable for an embodiment of the invention might be referred to as "thick film heaters" because the films are thicker, on a relative basis, than thinner films used in other industries and applications, such as the semiconductor industry. However, relative to existing heating elements and heaters for prior art cotton candy machines, the films and film heaters of the present invention are significantly thinner than the heating elements used and taught by that art.

Figure 4:
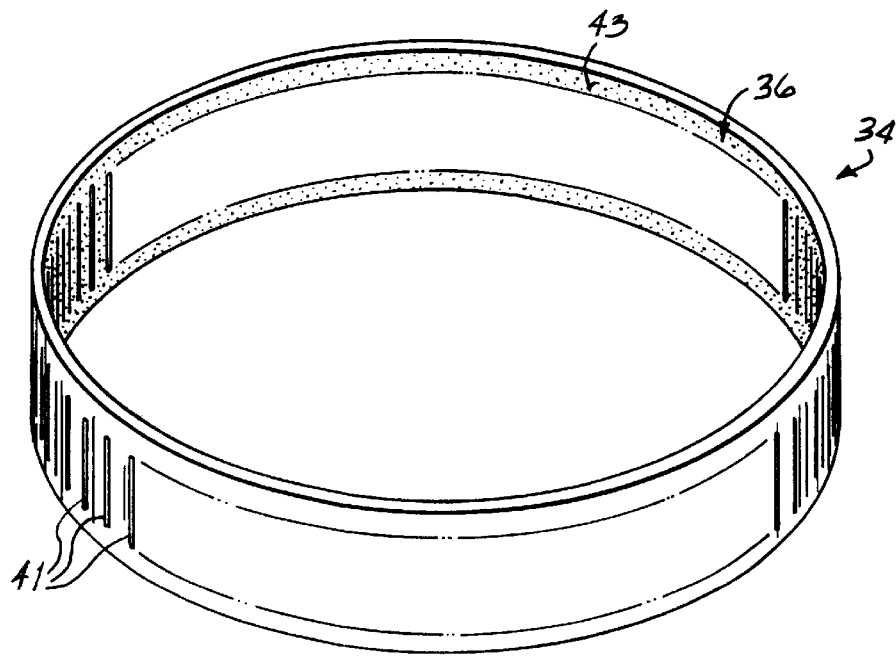
FIG. 4 is a perspective view of one embodiment of a band with a film heater applied thereto in accordance with the principles of the present invention.
Figure 4A:
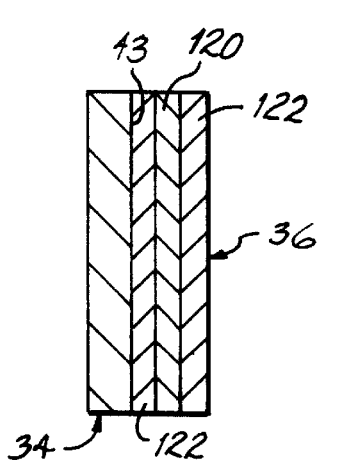
FIG. 4A is a cross-sectional view of one suitable film heater embodiment for the invention.

Referring to the cross-section of FIG. 4A, one suitable film heater may utilize a film 120 which is positioned on a surface 43 of a perforated band 34. That is, the film 120 is positioned or applied directly onto the surface 43 of band 34 without an intermediate substrate between the band and film. An electrically insulative material layer 122, such as a dielectric material layer, is positioned underneath the film and between the film and band to electrically insulate the film from the band. As discussed herein, a suitable band material is stainless steel or aluminum which are electrically and thermally conductive. The dielectric material layer 122 prevents the film 120 from shorting to the band 34. To further insulate the film 120, such as to prevent shorting or a shock hazard, the outward surface of film 120 away from band 34 might also have a layer of dielectric material 122 thereon. Such a film heater 36 might be provided in accordance with the principles of the invention, by Watlow Industries of Hannibal, Mo.

Figure 4B:
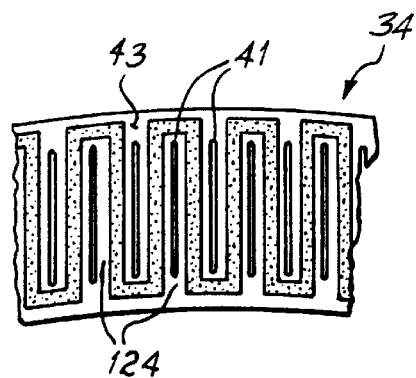
FIG. 4B is a partial perspective view of another suitable film heater embodiment for the invention.

The film material will generally be a resistive material which heats up when power is supplied thereto. One suitable film material includes a resistance ink, which may be printed onto the band 34 in a desired pattern. The film may be applied in any suitable pattern for providing consistent and uniform heat to the system and band 34. For example, the pattern may be similar to that shown in FIG. 4B, wherein the film runs above and below the apertures 41 in the band and in between those apertures. Preferably, the pattern and film 120 are coextensive with a significant portion of the band surface 43 on which they are positioned. Furthermore, the film is formed in a pattern which follows boundaries of the band surface to cover large areas of the band surface 43. In that way, the heat is provided uniformly around the spinner head. The film 120 and film heater 36 have open areas 124 therein which are coextensive with portions of the band apertures 41 for allowing the molten sugar to pass through the heater 36 and band 34. The film 120 may be positioned on surface 43 of band 34 in suitable procedures as might be understood by a person skilled in the art. For example, depending upon the material of the film, the film might be printed, sprayed, plated, or otherwise deposited, such as by chemical vapor deposition or physical vapor deposition (e.g. sputtering) onto surface 43 of band 34. Usually, the insulative material layers 122 will be applied first, and then film 120 is applied on top of the insulative layer or layers. One or more additional insulative layers may be applied on top of the film as illustrated in FIG. 4A. The insulative layers 122 could coincide with the pattern of film 120, or may be otherwise applied.

In an alternative embodiment of the invention, the film heater 36 may be positioned on an intermediate substrate, such as an aluminum or stainless steel substrate (not shown). The intermediate substrate and film making up the film heater could then be applied, or otherwise thermally coupled, to the perforated band 34. The intermediate substrate and film 120 then act as the effective film heater. Some thick film heaters available from Watlow Industries may have such a construction. Using an intermediate substrate, the film heater 36 would be similar to that shown in FIG. 4A with the intermediate substrate substituted for band 34. The intermediate substrate and film combination would then be applied against the surface of the band 34. For example, the intermediate substrate might be similar in shape to band 34 except with a smaller diameter. The film would be positioned on the outside of the substrate. The substrate and film would then be applied against the surface of the band by being fit into the inside of band 34 to be thermally coupled with the band.

In another embodiment, a flexible film heater available from Heatron of Leavenworth, Kans., might be utilized as the film heater element of the invention. Such a flexible film heater could be vulcanized right to surface 43 of band 34.

A suitable material for the band 34 itself is stainless steel, as illustrated in FIG. 4. Aluminum might also be an option. A series of perforations, such as slits, are machined or otherwise formed in band 34 for allowing molten sugar to pass therethrough and be flung to the liner 16. While the perforations are illustrated as vertical slots 41 in FIG. 4, the slots might also be slanted or otherwise oriented. Similarly, different shapes of perforations, rather than thin slots may be utilized.

In one embodiment of the invention, perforated band 34 comprises an approximately one inch wide band of stainless steel which is rolled into a ring and welded at its end to form a short one inch high tube. The band 34, having an inner diameter of approximately 5-½ inches would be suitable for existing cotton candy machines sold by Gold Medal Products Company, although other size bands may also be utilized. Suitable slots 41 may be ⅝ inch long and approximately 0.015 inches wide.

In prior art cotton candy machines, various elements rather than the perforated band were used to capture granular sugar and ensure melting and to determine the size of the cotton candy strands. As such, prior art spinner heads have always used somewhat large apertures for slinging the molten sugar which are too large to capture granular, unmelted sugar, or to define the size of the melted strands. As will be understood, fine strands of cotton candy are desirable for aesthetic purposes, feel, and volume. In accordance with one embodiment of the invention, the band itself ensures that the granular sugar is held in the spinner head until it melts and flows through the apertures or slots 41 at the desired size. This is particularly the case when the film 120 is deposited or otherwise applied directly onto the band rather than on an intermediate substrate. To that end, the slots 41 or other apertures in band 34 are configured for predominantly preventing granular sugar from passing through the band unmelted and to ensure that the melted and subsequently congealed strands are of a proper, preferably fine, size. Since sugar granules have different sizes and the fibers might also be different sizes, the absolute size of the apertures will depend on the granule size and desired fineness of the strand. In one embodiment, the smallest dimension of the aperture, for example the width dimension of slots 41, could be less than approximately $0.015 \pm 0.007$ inches. Of course, the type of sugar to be used and the desired strand size may allow a smaller or larger dimension. As noted above, one suitable embodiment uses slots which are 0.015 inches wide.

The present invention provides significant advantages over the prior art. First, in an embodiment of the invention, a separate heating element does not have to be utilized and mechanically fit against the side of the perforated band 34. Furthermore, the design of the perforated band is significantly simpler than existing designs which had to secure, house, and protect the heating element. Furthermore, expensive coatings are not required on the band of the invention as are necessary for prior art machines. Therefore, the present invention reduces the cost of manufacturing the cotton candy machine. A further advantage derives from the efficiency of the film heater which uniformly heats the entire surface of the perforated band for efficient heat transfer to the sugar. Generally, the film heater 36 will cover a significant portion of the inside surface of the perforated band 34 for efficient heating, in one embodiment. Existing heating elements, which relied simply upon a pressed or forced contact between the heating element and the band, are not as efficient.

Another advantage provided by the present invention is that the heater significantly eliminates the weight and ballast of prior heating elements and bands which may affect the rotation of the motor and bearings and the wear on those elements. As may be appreciated, the spinner head of the invention weighs significantly less than prior art spinner heads, and the weight distribution of the film heater will be generally more equally distributed around the circumference of the perforated band 34.

Still another advantage of the present invention is provided by the reduced possibility of the heating element malfunctioning. In prior art cotton candy machines, heating elements have been known to short or otherwise malfunction due to chipping of the coating on the element supporting the heating element.

The perforated band and film heater combination of the present invention is easily mounted within the spinner head 18 between spinner cap 30 and the upper head 32. To that end, a recess 37 is formed between the spinner cap 30 and upper head 32 to form opposing lips 49 which capture the upper circumferential edges of the perforated band 34.

Still referring to FIGS. 2 and 3, the upper head 32 includes a disk 38 of non-conductive material such as a polymer and preferably a polycarbonate derivative having a density less than aluminum and at least one spacer sleeve 40 formed integrally with a disk 38. The spacer sleeve 40 has a bore 42 therethrough. Preferably, the disk 38 has a plurality of the spacer sleeves 40 formed integrally therewith, and the cap 30 has a plurality of bores 44 therein indexed to be aligned with the spacer sleeves 40. A plurality of fasteners 46, such as screws, pass through the bores 44 in the cap 40 and the bores 42 in the spacer sleeves 40 to secure the cap 30 and the upper head 32 together. The spacer sleeves 40 electrically insulate the fasteners 46. The cap 30 and upper head 32, when together, cooperate to hold the band 34 and film heater 36 in place as seen in FIG. 3.

A jack screw 45 is threaded into upper head 32 and engages an upper end of a motor shaft (not shown) to support the spinner head 10. An acorn nut 47 on jacket screw 45 secures an insulator plate 39 over electrical terminals 33 and 35. The top of the cap 30 may have mounted thereon leather floaters 48, which are held to the cap 30 with screws 50.

The upper head 32 preferably further includes a depending hub 52 about the axis A, which is molded integrally with the disk 38. The hub 52 includes a drive bore 54 extending therein. Drive bore 54 is shaped to accommodate a drive shaft (not shown) of a motor mounted in base 12 (FIG. 1) for rotating the spinner head 18 about axis A. The hub 52 also has a bore 56 therethrough, offset from axis A. A depending sleeve 58 is formed integrally with the hub 52 and is also offset from the axis A. The sleeve 58 also has a bore 60 therethrough and continuing upwardly through hub 52. In FIG. 3, the bores 56 and 60 are shown on opposite sides of the head 32, although they could be otherwise arranged.

The spinner head 18 preferably further includes a lower head 62 having a hub 64 about axis A and a flange 66 formed integrally with the hub 64. The flange 66 has a bore 68 therethrough, and the flange 66 also has a depending sleeve 70 formed integrally therewith. A bore 72 extends through the depending sleeve 70 and the flange 66 to be coextensive with bore 68. The hub 64 includes a drive bore 95 extending therein. Drive bore 95 is shaped to accommodate a drive shaft (not shown) of a motor mounted in base 12 (FIG. 1) for rotating the spinner head 18 about axis A.

It will be appreciated that the reference to "upper head" and "lower head" are used herein for indicating general orientation of parts relative to each other and are not to be construed as limiting the structure of the spinner head 18, or its function in any way.

Preferably, the cap 30, upper head 32 and the lower head 62 are each made of an electrically insulating material having a density less than aluminum. A person of ordinary skill in the art will appreciate that an appropriate material, could be, for example, a polymeric material, such as a polycarbonate derivative.

Continuing with further details of the spinner head 18, the spinner head preferably further includes a first conductive slip ring 80, disposed between the upper head 32 and the lower head 62. The first slip ring 80 has a first bore 82 therethrough for receiving the sleeve 58 depending from the hub 52 of the upper head 32. A second, spaced bore 84 extends through the first slip ring. A second slip ring 90 is disposed adjacent the lower head 62. The second slip ring 90 has a first bore 92 therethrough for receiving the sleeve 70 depending from the flange 66 of the lower head 62. The second slip ring 90 has a second bore 94 extending therethrough. The spinner head 18 also has a phenolic washer 96 adjacent said lower head 62.

The upper head 32, lower head 62, slip rings 80 and 90, and the phenolic washer 96 are held together by head studs or elongated conductors 100, 102, and nuts 103, 104 and 105. Head stud 100 passes through the bore 72 in the sleeve 70 depending from the flange 66 of the lower head 62, through the bore 84 in the first slip ring 80 and through the bore 56 of the upper head 32 to contact electrical terminal 33, which is secured to the upper head 32 by nut 103. It will be appreciated that conductor or stud 100 is electrically insulated from the second slip ring 90 by sleeve 70, but it is in electrical contact with the first slip ring 80 and the electrical terminal 33, which is secured to the upper head by nut 103.

Head stud 102 passes through and contacts the bore 94 in the second slip ring 90, passes through the bore 68 in flange 66, passes through the bore 60 in the sleeve 58 depending from the hub 52 of the upper head 32, and through the upper head to contact electrical terminal 35, where it is held by nut 105. It will be appreciated that the head stud 102 is insulated from the first slip ring 80 by sleeve 58, but it is in electrical contact with the second slip ring 90.

As noted above, in a somewhat analogous fashion, stud 100 extends through bore 72 in sleeve 70, insulating stud 100 from slip ring 23 90. Stud 100 extends through bore 84, contacting ring 80, and upwardly through hub 52 to terminal 33.

Referring to FIG. 2, in the embodiment illustrate, electrical terminal 35 is connected to the film heater 36 by lead wire 108, and electrical terminal 33 is connected to the film heater 36 by lead wire 110. Appropriate contact points of the film heater will be coupled to the lead wires 108, 110 so that current may be directed through the film heater to cause it to heat the band 34. In use, it will be appreciated that the cotton candy machine 10 provides electrically conductive brushes (not shown) for sliding engagement with the respective slip rings 80, 90 to connect the respective electrical terminals 33 and 35 by respective studs 100, 102, to an appropriate source of power for energizing the film heater 36 as the spinner head turns.

In one embodiment of the invention, powering of the film heater 36 of the spinner head 18 of the present invention is somewhat similar to the powering of the heating elements of the spinner head shown in U.S. Pat. Nos. 4,872,821, 5,441,754, and 5,498,144, incorporated herein by reference, with the exception, of course, that the spinner head 18 of the current invention provides significant benefits as noted herein in accordance with the principles of the invention.

While the present invention has been illustrated by a description of various embodiments and while these embodiments have been described in considerable detail, it is not the intention of the applicant to restrict or in any way limit the scope of the appended claims to such detail. For example, the cotton candy machine and spinner head of the present invention can be used with multiple different perforated band designs and film heaters. Additional advantages and modifications will readily appear to those skilled in the art. The invention in its broader aspects is therefore not limited to the specific details, representative apparatus and method, and illustrative example shown and described. Departures may be made from such details without departing from the spirit or scope of applicant's invention and applicant intends to be bound only by the claims appended hereto.

What is claimed is:

1. An apparatus for making cotton candy comprising:
a bowl;
a motor with a rotating shaft;
a spinner head mounted in said bowl and coupled to the rotating shaft for rotation about an axis;
the spinner head comprising a perforated band which extends generally circumferentially around the spinner head to rotate with the spinner head, the perforated band including a plurality of perforations therein for delivering molten sugar from the spinner head and into the bowl to make cotton candy;

a film heater including a film which is operable for generating heat when an electrical current is delivered thereto, the film heater being applied against a surface of the perforated band for heating the band and melting sugar proximate the perforated band to make cotton candy.

2. The apparatus of claim 1 wherein said film is applied directly onto said band surface for forming the film heater.

3. The apparatus of claim 1 wherein said film heater comprises a film applied to a substrate, the film operable to heat the substrate, and the film and substrate being thermally coupled to said band surface for heating the band.

4. The apparatus of claim 3 further comprising an electrically insulative material positioned between the film and the substrate.

5. The apparatus of claim 1 further comprising an electrically insulative material positioned on at least one side of the film to electrically isolate the film from the band.

6. The apparatus of claim 1 wherein said perforations include slots.

7. The apparatus of claim 1 wherein said film is coextensive with a significant portion of the band surface.

8. The apparatus of claim 1 wherein the film is formed in a pattern which follows boundaries of said band surface.

9. The apparatus of claim 3 wherein said substrate includes one of aluminum and stainless steel.

10. The apparatus of claim 1 wherein said band includes an inner surface and an outer surface, the film heater being applied against an inner surface of the band for melting sugar before it passes through the perforated band.

11. The apparatus of claim 1 wherein the film heater has open areas therein, at least one of the open areas being coextensive with a portion of a band aperture.

12. The apparatus of claim 1 wherein the spinner head further comprises an upper head and a cap, the perforated band and film being positioned between said upper head and cap.

13. The apparatus of claim 12 wherein said cap and said upper head are formed from a rigid material having a density less than aluminum.

14. The apparatus of claim 13 wherein said rigid material is a polymer.

15. The apparatus of claim 1 wherein said perforated band is formed of one of stainless steel and aluminum.

16. The apparatus of claim 1 wherein said band is configured to generally prevent granular sugar from passing therethrough before it is melted.

17. The apparatus of claim 16 wherein the perforations have at least one dimension in the range of approximately 0.015±0.007 inches.

18. An apparatus for making cotton candy comprising:

a bowl;

a motor with a rotating shaft;

a spinner head mounted in said bowl and coupled to the rotating shaft for rotation about an axis;

the spinner head comprising a perforated band which extends generally circumferentially around the spinner head to rotate with the spinner head, the perforated band including a plurality of perforations therein for delivering molten sugar from the spinner head and into the bowl to make cotton candy;

a film heater including a film which is operable for generating heat when an electrical current is delivered thereto;

the film of the film heater being applied directly onto a surface of the perforated band for providing heat and melting sugar proximate the perforated band to make cotton candy.

19. The apparatus of claim 18 wherein said film is deposited onto said surface.

20. The apparatus of claim 18 wherein said film is printed onto said surface.

21. The apparatus of claim 20 wherein said film includes a resistive ink.

22. The apparatus of claim 18 further comprising an electrically insulative material applied onto the surface of the band between the film band to electrically isolate the film from the band.

23. The apparatus of claim 18 further comprising an electrically insulative material applied on an outside surface of the film to electrically isolate the film.

24. The apparatus of claim 18 wherein said film is coextensive with a significant portion of the band surface.

25. An apparatus for making cotton candy comprising:

a bowl;

a motor with a rotating shaft;

a spinner head mounted in said bowl and coupled to the rotating shaft for rotation about an axis;

the spinner head comprising a perforated band which extends generally circumferentially around the spinner head to rotate with the spinner head, the perforated band including a plurality of perforations therein for delivering molten sugar from the spinner head and into the bowl to make cotton candy;

a film heater including a film which is operable for generating heat when an electrical current is delivered thereto;

the film heater being thermally coupled with the perforated band for providing heat and melting sugar proximate the perforated band to make cotton candy.

26. The apparatus of claim 25 wherein the film of the film heater is deposited onto a surface of the band.

27. The apparatus of claim 25 wherein the film of the film heater is printed onto a surface of the band.

28. The apparatus of claim 25 further comprising an electrically insulative material coupled between the film and the band between when the film heater is coupled to the band for electrically isolating the film from the band.

* * * * *

UNITED STATES PATENT AND TRADEMARK OFFICE
CERTIFICATE OF CORRECTION

PATENT NO. : 6,585,504 B2
DATED : July 1, 2003
INVENTOR(S) : Ronald R. Weiss

It is certified that error appears in the above-identified patent and that said Letters Patent is hereby corrected as shown below:

<u>Title page,</u>
Item [*] Notice, "Subject to any disclaimer, the term of this patent is extended or adjusted under 35 U.S.C.154 (b) by 51 days." should read -- Subject to any disclaimer, the term of this patent is extended or adjusted under 35 U.S.C.154(b) by 127 days.

Signed and Sealed this

Twenty-eighth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,585,504 B2
DATED : July 1, 2003
INVENTOR(S) : Ronald R. Weiss

It is certified that error appears in the above-identified patent and that said Letters Patent is hereby corrected as shown below:

Title page,
Item [*] Notice, "Subject to any disclaimer, the term of this patent is extended or adjusted under 35 U.S.C.154 (b) by 51 days." should read -- Subject to any disclaimer, the term of this patent is extended or adjusted under 35 U.S.C.154(b) by 111 days. --

This certificate supersedes Certificate of Correction issued September 28, 2004.

Signed and Sealed this

Thirtieth Day of November, 2004

JON W. DUDAS
*Director of the United States Patent and Trademark Office*